(12) United States Patent
Akiyama et al.

(10) Patent No.: US 7,532,665 B2
(45) Date of Patent: May 12, 2009

(54) WIRELESS COMMUNICATION APPARATUS AND METHOD, AND COMPUTER PROGRAM

(75) Inventors: Keiji Akiyama, Tokyo (JP); Katsuyuki Tanaka, Kanagawa (JP); Masayuki Takada, Tokyo (JP)

(73) Assignee: Sony Corporation, Tokyo (JP)

( * ) Notice: Subject to any disclaimer, the term of this patent is extended or adjusted under 35 U.S.C. 154(b) by 630 days.

(21) Appl. No.: 11/139,684

(22) Filed: May 31, 2005

(65) Prior Publication Data

US 2005/0276319 A1 Dec. 15, 2005

(30) Foreign Application Priority Data

Jun. 11, 2004 (JP) ............... 2004-174781

(51) Int. Cl.
*H04B 1/38* (2006.01)
(52) U.S. Cl. ...................... 375/220; 375/221
(58) Field of Classification Search ................. 375/220, 375/221, 355, 357, 358; 455/86; 370/282, 370/508, 310.1, 469
See application file for complete search history.

(56) References Cited

U.S. PATENT DOCUMENTS

| 6,111,536 A | 8/2000 | Richards et al. |
| 6,283,104 B1 | 9/2001 | Ito et al. |

| 2001/0021639 A1 | 9/2001 | Kaku | |
| 2006/0234761 A1* | 10/2006 | Nagasaka | ............... 455/552.1 |
| 2006/0251148 A1* | 11/2006 | Welborn et al. | ............. 375/130 |

FOREIGN PATENT DOCUMENTS

| JP | 08-062334 | 3/1996 |
| JP | 09-139730 | 5/1997 |
| JP | 10-210018 | 8/1998 |
| JP | 3118578 | 10/2000 |
| JP | 2001-050147 | 2/2001 |
| JP | 2001-183447 | 7/2001 |
| JP | 2001-251238 | 9/2001 |
| JP | 2002-517001 | 6/2002 |

* cited by examiner

*Primary Examiner*—David C Payne
*Assistant Examiner*—Rahel Guarino
(74) *Attorney, Agent, or Firm*—Oblon Spivak, McClelland, Maier & Neustadt, P.C.

(57) ABSTRACT

A wireless communication apparatus for transmission/reception of a wireless communication signal, including first and second circuits that process a transmission/reception signal, an oscillator that generates a reception clock on a first circuit side, the reception clock being used for an operation reference, a first interface that supplies the reception clock from the first circuit to the second circuit, a second interface that supplies, to the first circuit, transmission data output from the second circuit synchronously with the reception clock supplied from the first circuit, and delay compensation that compensates for a delay between the reception clock and transmission data at the first circuit, the reception clock and transmission data being input via the second interface.

3 Claims, 6 Drawing Sheets

WIRELESS COMMUNICATION APPARATUS AND METHOD, AND COMPUTER PROGRAM

CROSS REFERENCES TO RELATED APPLICATIONS

The present document contains subject matter related to Japanese Patent Application JP 2004-174781 filed in the Japanese Patent Office on Jun. 11, 2004, the entire contents of which being incorporated herein by reference.

BACKGROUND OF THE INVENTION

1. Field of the Invention

The present invention relates to a wireless communication apparatus and method, and a computer program, for transmitting and receiving a wireless communication signal, and more particularly to a wireless communication apparatus and method, a computer program, capable of data transmission and distance measurement.

2. Description of Related Art

More specifically, the present invention relates to a wireless communication apparatus and method, and a computer program, in which ranging of a distance between wireless apparatuses is performed on the basis of a time from a packet transmission to a packet reception, and more particularly to a wireless communication apparatus and method, and to a computer program, which compensates for timings or a delay time between a data signal and a clock signal.

A wireless LAN has drawn attention as a system capable of releasing users from LAN wirings of a wired type. Wireless LAN can omit most of cables in a work space of an office and the like so that communication terminals such as personal computers (PC) can be moved relatively easily. Demands for wireless LAN is increasing greatly because of recent tendency of higher speed and lower cost required in wireless LAN systems. Introducing a personal area network (PAN) has been studied recently in order to configure a small scale wireless network of an plurality of electronic apparatuses installed in a personal area and perform information communication. For example, different wireless communication systems and apparatuses are defined by using frequency bands whose license by a supervisory office is not necessary, such as 2.4 GHz band and 5 GHz band.

For example, a wireless communication scheme called "ultra wide band (UWB) communication" for transmitting information carried by a faint impulse sequence has drawn attention as a wireless communication system realizing near field ultra high speed transmission, and this scheme is expected to be used in practice. As an access control method for ultra wide band communication, a data transmission scheme of a packet structure including a preamble is currently devised in IEEE 802.15.3 and the like.

UWB communication has a high temporal resolution if an ultra narrow pulse is used. By utilizing this property, "ranging (distance measurement)" for radar and positioning becomes possible. Recent UWB communication can provide both high speed transmission in excess of 100 Mbps and an inherent ranging function (e.g., refer to Japanese Translation of PCT International Application (KOHYO) No. 2002-517001 (Patent Document 1)).

It is anticipated that a wireless personal access network (WPAN) for near field communication (NFC), typically UWB, is configured for a variety of electronic home appliances and consumer electronics (CE). It is therefore considered that value added wireless communication in addition to high speed data transmission is to be realized by utilizing position information through ranging, such as navigation and near field communication. It is considered that a ranging function in addition to high speed data transmission is desired to be implemented.

Generally, a ranging system of this type measures a distance on the basis of a time from a packet transmission to a packet reception. A range target apparatus only returns a received signal after carrying out almost no processing on it. As an example, the range target apparatus returns a signal sent from a ranging wireless apparatus by superposing upon it information relating to the range target apparatus. The ranging wireless apparatus measures a distance by measuring a turn-around radio wave propagation time (for example, refer to Japanese Patent No. 3118578 (Patent Document 2)). There is, however, another method by which a ranging apparatus measures a distance on the basis of a time from a transmission to a return signal reception from a range target apparatus, the time including the signal processing times in the ranging apparatus and the range target apparatus (for example, refer to Published Japanese Patent Application (KOKAI) No. 2001-183447 (Patent Document 3), Published Japanese Patent Application (KOKAI) No. 2001-50147 (Patent Document 4) and Published Japanese Patent Application (KOKAI) No. HEI-8-62334 (Patent Document 5)).

In this ranging system measuring a distance between wireless apparatuses on the basis of a time from a packet transmission to a packet reception, the time includes the signal processing times in the ranging apparatus and the range target apparatus. It is therefore necessary to compensate for timings or a delay time between a data signal and a clock signal, when the data signal is transmitted.

A delay between a data signal and a clock signal is roughly classified into a delay within one clock period and a delay over one clock period.

For example, elastic store operation has been proposed which can perform data transmission correctly at all clock timings (for example, refer to Published Japanese Patent Application (KOKAI) No. HEI-9-139730 (Patent Document 6)).

A data transmission apparatus has been proposed (for example, refer to Published Japanese Patent Application (KOKAI) No. HEI-10-210018 (Patent Document 7)). According to this apparatus, a data signal is synchronized with a clock signal having a constant period, and the data signal and the clock signal are transmitted from a transmission side to a reception side via a transmission route. In this case, a relative delay amount between the data signal and the clock signal can be set reliably in an allowable range, and a variety of routes can be adjusted independently.

An interface circuit has been proposed which automatically adjusts a variation in a data transmission delay time to retain a phase for correctly receiving data (for example, refer to Published Japanese Patent Application (KOKAI) No. 2001-251283).

However, all of the above-described techniques adopt the configuration that data is delayed relative to the clock to the position where the data can be correctly acquired, when data is transferred synchronously with the clock. In other words, only a delay in one clock period is compensated, and a delay over one clock period is not processed specifically so that a delay amount relative to the clock cannot be compensated in a synchronizing system.

A ranging communication apparatus cannot determine whether data is delayed one period or longer relative to a clock so that correct ranging cannot be realized.

The present invention provides an excellent wireless communication apparatus and method, and a computer program, capable of both data transmission and distance measurement (ranging).

The present invention also provides an excellent wireless communication apparatus and method, and a computer program, capable of proper ranging between wireless communication apparatuses on the basis of a time from a packet transmission to a packet reception.

The present invention further provides an excellent wireless communication apparatus and method, and a computer program, capable of compensating for timings or a delay time between a data signal and a clock signal when the data signal is transmitted.

The present invention has been made in consideration of the above-described issues. According to a first aspect of the present invention, there is provided a wireless communication apparatus for transmission/reception of a wireless communication signal, comprising:

first and second circuits for processing a transmission/reception signal;

an oscillator for generating a reception clock on a first circuit side, the reception clock being used for an operation reference;

a first interface for supplying the reception clock from the first circuit to the second circuit;

a second interface for inputting, to the first circuit, transmission data output from the second circuit synchronously with the reception clock supplied from the first circuit; and delay compensating means for compensating for a delay between the reception clock and transmission data at the first circuit, the reception clock and transmission data being input via the second interface.

For example, the first circuit may be a wireless circuit module for performing a transmission/reception process of a wireless communication signal and the second circuit may be a physical layer module for processing transmission data in a physical layer protocol.

In a ranging system measuring a distance between wireless apparatuses on the basis of a time from a packet transmission to a packet reception, the time includes the signal processing times in a ranging apparatus and a range target apparatus. It is therefore necessary to compensate for timings or a delay time between a data signal and a clock signal, when the data signal is transmitted.

A delay between a data signal and a clock signal is roughly classified into a delay within one clock period and a delay over one clock period. Although a related art data transmission apparatus can compensate for a delay in one clock period, a delay over one clock period is not processed specifically.

The wireless communication apparatus of the present invention is provided with the delay compensating means for compensating for a delay between the reception clock and the transmission data at the first circuit, the reception data and transmission data being input via the second interface. This delay compensating means inserts a proper delay amount into the transmission data and maintains a delay of the transmission data to be always constant to thereby compensate for the delay time.

The wireless communication apparatus of the present invention is provided with a data transmission mode for executing a data transmission process and a calibration mode for compensating for a delay time of transmission data.

In the calibration mode, the delay compensating means sends a calibration pulse having a duration over an anticipated maximum delay time from the first circuit to the second circuit via the first interface, and compensates for a delay time on the basis of a delay between a pulse looped-back from the second circuit to the first circuit via the second interface and the original calibration pulse.

In accordance with a phase difference between the pulse looped-back from the second circuit to the first circuit via the second interface and the original calibration pulse, the delay compensating means compensates for a delay time less than one clock period. A proper delay amount is inserted into transmission data to make the transmission data have the maximum delay time.

As described above, according to the present invention, even if the first and second interfaces operate at a high speed clock, correct data transmission is possible irrespective of a variation in a data delay amount.

Further, a variation in a data transmission time per clock unit to be caused by a variation in a sampling position of the clock due to a data delay amount can be fixed to a predetermined constant value. Data transmission sensitive to a time fluctuation is therefore possible.

According to a second aspect of the present invention, there is provided a computer program written in a computer readable format so as to make a computer system execute a process for allowing a wireless communication apparatus to perform delay time compensated data transmission, the wireless communication apparatus comprising first and second circuits for processing a transmission/reception signal, an oscillator for generating a reception clock on a first circuit side, the reception clock being used for an operation basis, a first interface for supplying the reception clock from the first circuit to the second circuit, and a second interface for inputting, to the first circuit, transmission data output from the second circuit synchronously with the reception clock supplied from the first circuit, the computer program comprising the steps of:

sending a calibration pulse having a duration over an anticipated maximum delay time from the first circuit to the second circuit via the first interface;

compensating for a delay time in one clock period in accordance with a phase difference between a pulse looped-back from the second circuit to the first circuit via the second interface and the original calibration pulse; and inserting a proper delay amount into transmission data to make the transmission data have a maximum delay time.

The computer program according to the second aspect of the present invention is a computer program written in a computer readable format so as to make a computer system execute a predetermined process. In other words, by installing a computer program according to the second aspect of the present invention in a computer system, the computer system achieves cooperative operations so that it is possible to obtain operations and effects similar to those of the wireless communication apparatus according to the first aspect of the present invention.

According to the present invention, it is possible to provide an excellent wireless communication apparatus and method, and a computer program, capable of both data transmission and distance measurement.

Further, according to the present invention, it is possible to provide an excellent wireless communication apparatus and method, and a computer program, capable of proper ranging between wireless apparatuses in accordance with a time from a packet transmission to a packet reception.

Furthermore, according to the present invention, it is possible to provide an excellent wireless communication apparatus and method, and a computer program, capable of compensating for timings or a delay time between a data signal and a clock signal when the data signal is transmitted.

According to the present invention, for data transmission synchronous with a clock, a clock signal and a signal synchronous with the clock signal can be transmitted to a communication partner. Conversely, when the signal synchronous with the clock signal is received at the communication partner, data can be synchronized with an original own clock signal of the communication partner, irrespective of a data delay amount at the transmission side. In this case, a delay can be adaptively inserted by measuring the delay amount at the transmission side in order to make the own data delay amount constant irrespective of the delay amount at the transmission side.

Other objects, features and advantages of the present invention will become apparent from more detailed description when read in conjunction with embodiments of the present invention to be described later and accompanying drawings.

DESCRIPTION OF PREFERRED EMBODIMENTS

Embodiments of the present invention will be described in detail with reference to the accompanying drawings.

A wireless communication apparatus according to the present invention adopts the above-described UWB transmission method for wireless communication using a faint impulse sequence which carries information, and is configured in such a manner that ranging between wireless communication apparatuses is carried out each time information transmission is performed, by utilizing a high temporal resolution due to the use of ultra narrow pulses.

Figure 1:
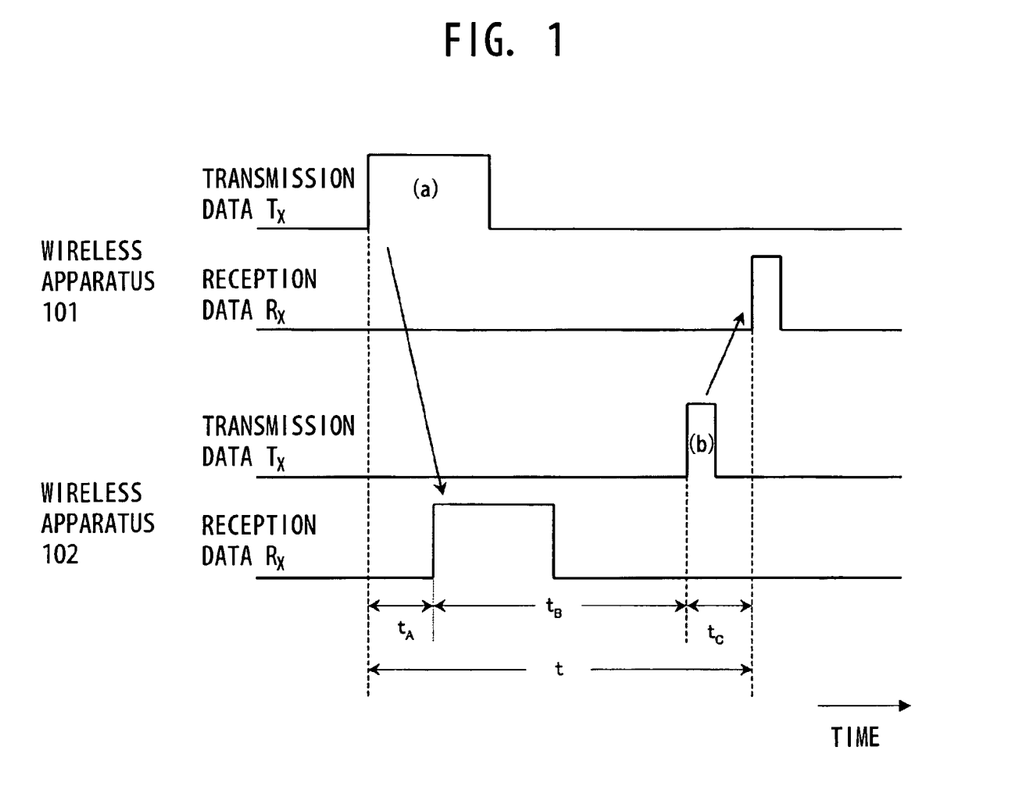
FIG. 1 is a view for explaining a mechanism of ranging between two wireless apparatuses to be executed through signal transmission/reception therebetween.

First, with reference to FIG. 1, description will be made on a mechanism of ranging between two wireless apparatuses to be executed through signal transmission/reception therebetween.

A wireless apparatus 101 sends a distance measurement packet (a) to a wireless apparatus 102 and thereafter waits until a packet (b) is returned from the wireless apparatus 102. The wireless apparatus 101 measures a time from transmission of the packet (a) to detection of the packet (b) with its own counter. A modulation speed for distance measurement signals is, for example, several hundreds MHz or higher.

When the wireless apparatus 102 receives and detects the packet (a) from the wireless apparatus 101, it returns the packet (b) to the wireless apparatus 101 after a predetermined time (after a lapse of an integer multiple of a unit time, to be described later).

The wireless apparatus 101 detects the returned packet (b) and calculates the distance from the wireless apparatus 101 to the wireless apparatus 102 in accordance with the count of the counter when the packet (b) is detected. The time shown in FIG. 1 is assumed to be the time recognized by a logic circuit.

t: a real time from when the wireless apparatus 101 sends a packet to when the wireless apparatus 101 detects a packet from the wireless apparatus 102.

$t_A$: a spatial propagation time ($t_{AIR}$) + a delay time in an RF transmission circuit of the wireless apparatus 101 ($t_{DT1}$).

$t_B$: a delay time in an RF reception circuit of the wireless apparatus 102 ($t_{DR2}$) + a process time of the wireless apparatus 102 ($t_{P2}$).

$t_C$: a delay time in an RF reception circuit of the wireless apparatus 101 ($t_{DR1}$) + a process time of the wireless apparatus 101 ($t_{P1}$) + a spatial propagation time ($t_{AIR}$).

Of the process time of the wireless apparatus 102, the process time required for signal detection and each delay time of RF transmission/reception circuits are fixed values. The time t is expressed as in the following from the above-described definitions.

$$t=t_A+t_B+t_C=2t_{AIR}+t_{D1}+t_{D2}+t_{P1}+t_{P2} (t_{D1}=t_{DT1}+t_{DR1}, t_{D2}=t_{DT2}+t_{DR2}) \quad (1)$$

A distance d between wireless apparatuses is given by the following.

$$d=c \cdot t_{AIR} \text{ (C=velocity of light)} \quad (2)$$

The wireless apparatus 101 counts the time and calculates $t_{AIR}$ from the equation (1) so that the distance d between wireless apparatuses can be obtained. With an ultra wide band signal used in a system such as UWB, a high temporal resolution can be obtained in reception pulse detection or correlation detection. For example, if a temporal resolution is one nano second, a distance resolution of the wireless communication system is 30 cm.

In this manner, a distance between wireless apparatuses can be measured through mutual communications. However, the process time $t_{P2}$ of the wireless apparatus 102 constituting the wireless network includes time durations such as an inter frame space (IFS) and a random delay time to be used for lowering a packet collision probability. In this case, $t_{P2}$ (or $t_B$) of the wireless apparatus 102 is not a fixed value. Therefore, the wireless apparatus 101 is required to know $t_{P2}$ by some method such as making the packet returned from the wireless apparatus 102 carry information on the process time $t_{P2}$. Adding special information to a packet for the sake of ranging is not preferable from the viewpoint of efficient use of a band.

In order to solve this problem, the process time $t_{P2}$ (or $t_B$) of the wireless apparatus 102 including IFS and a random delay time is set to an integer multiple of a specific unit time, e.g., 100 nano seconds×N. It is defined in the communication system only that N is an integer and its value is indefinite. In such a case, on the side of the wireless apparatus 101, after a packet is transmitted, a packet detection process is repetitively executed at only around the timing after an integer multiple of the specific unit time having a possibility that a packet is returned. For example, the packet detection process detects a correlation value to spreading code, and the position at which the correlation value takes a maximum value equal to or larger than a predetermined correlation value is used as a measurement result.

For example, if the process time $t_{P2}$ (or $t_B$) of the wireless apparatus 102 is set to the unit time of 100 nano seconds, a propagation distance of a signal per unit time is obtained by multiplying the velocity of light c by the distance, i.e., 30 m. Since it is defined only that a packet is returned by a delay time of N times the unit time and its value is indefinite, a multiple of a distance of 30 m per unit time comes up as an indefinite portion of the packet detection process. A communicable distance of usual high speed transmission has a limit. For example, in a case where a communication system has a communicable distance of 30 m or shorter, if a ranging area is limited to 30 m or shorter, this indefiniteness is not associated with any problem at all.

Therefore, the wireless apparatus 101 can identify a remainder of the distance obtained by the above-described equation (2) divided by 30 m, as the distance between the wireless apparatuses 101 and 102. This is equivalent to that after the value of N is identified, 100 nano seconds ×N is subtracted from t to thereafter calculate the above-described equation (2).

A precision of a distance d in the above-described equation (2) is dependent upon that each of the wireless apparatuses 101 and 102 can correctly measure and transmit a distance measurement signal. In other words, it is necessary to compensate for a delay time between a data signal and a clock signal. It is particularly very important for each wireless apparatus to have correct information on its reception delay amount and transmission delay amount and to transmit a signal at a correct time interval.

Figure 2:
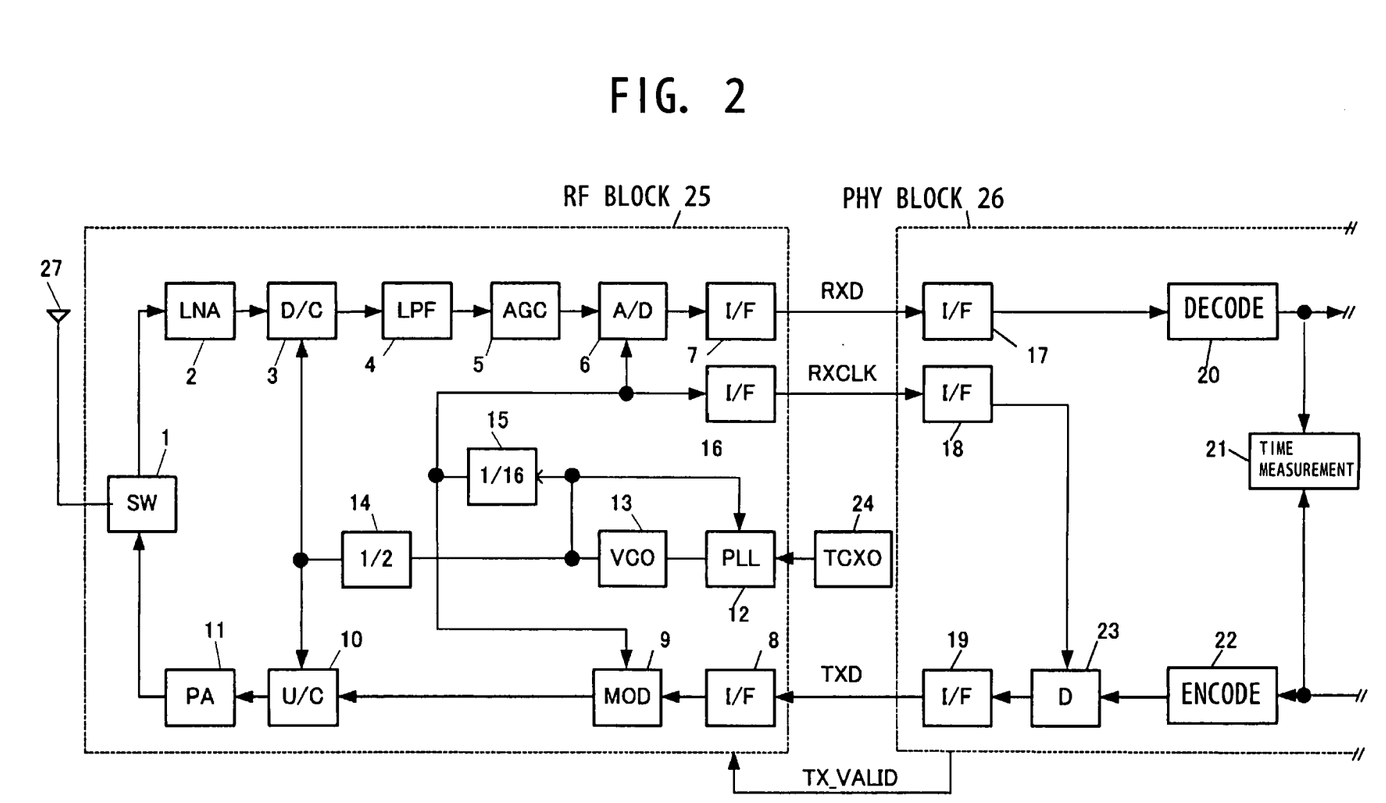
FIG. 2 is a schematic diagram showing the structure of a wireless communication apparatus capable of both data transmission and distance measurement.

FIG. 2 is a schematic diagram showing the structure of a wireless communication apparatus capable of both data transmission and distance measurement. As shown, the wireless communication apparatus is constituted of: an antenna 27 for transmitting/receiving a wireless communication signal; a wireless (RF) block 25 for up-converting transmission data to a wireless communication signal and down-converting a received wireless communication signal; a physical layer (PHY) block 26 for executing digital processing such as encoding/decoding of transmission data; and a functional block (not shown) for executing media access control (MAC) and upper layer protocol processing.

The wireless block 25 and the physical layer block 26 may be configured in a single LSI chip. In this embodiment, however, these blocks are configured in separate chips by considering optimum process selection for the wireless block 25 and total cost.

Referring to FIG. 2, a reception system of the wireless block 25 is constituted of: a low noise amplifier (LNA) 2 for voltage-amplifying a ultra wide band signal received from another station via the antenna 27 and an antenna switch 1; a down-converter (D/C) 3 for down-converting a voltage-amplified reception signal through frequency conversion; a low-pass filter 4 for passing only low frequency components of a reception signal; an automatic gain control (AGC) amplifier 5 for automatically adjusting the level of a reception signal; an A/D converter 6 for converting an analog reception signal into a digital signal; and an interface circuit 7 for converting an internal signal level of a digital reception signal into a transmission level at the physical layer (PHY) block 26.

A transmission system of the wireless block 25 is constituted of: an interface circuit 8 for receiving a transmission signal from the PHY block 26; a modulator 9 for converting the transmission signal into a modulated signal; an up-converter (U/C) 10 for converting the modulated signal into a transmission signal at a carrier frequency; and a power amplifier (PA) 11 for amplifying a power of the up-converted transmission signal.

A voltage-controlled oscillator (VCO) 13 operates in cooperation with a phase lock loop (PLL) circuit 12 to generate a frequency of a base clock to be used for the transmission system and the whole system. A base frequency of the PLL 12 is supplied from a temperature-compensated crystal oscillator (TCXO) 24 disposed outside the wireless block 25. A one-second frequency divider 14 halves an output frequency from the VCO 13 to generate a carrier wave, and similarly a one-sixteenth frequency divider 15 generates a data clock by using the output frequency from the VCO 13. These frequency division ratios of the frequency dividers are only illustrative and should not limit the gist of the present invention.

Referring also to FIG. 2, the PHY block 26 is constituted of: an interface circuit 17 for receiving a reception signal from the RF block 25; a decoder 20 for decoding the reception signal; an encoder 22 for encoding a transmission signal; a delay (D-latch) 23 for synchronizing the transmission signal with a clock on the side of the RF block 25; an interface circuit 19 for transmitting the transmission signal to the RF block 25; and a time measurement unit 21 for measuring a transmission time at the PHY block and an arrival time of a reception signal. The time measurement unit 21 is constituted of a counter or a timer. The reception data clock generated by the one-sixteenth frequency divider 15 of the RF block 25 is supplied to the PHY block 26 via the interface circuits 16 and 18, and is used as a sync clock of the D-latch 23.

As described above, the RF block 25 and PHY block 26 are interconnected by the interface circuits 7 and 17, the interface circuits 16 and 18 and the interface circuits 8 and 19. These interface circuits are assumed to use high speed interface such as low voltage differential signaling (LVDS).

In order to improve precision of distance measurement, it is necessary to operate the entirety of the wireless apparatus by unified clocks. In the example shown in FIG. 2, the wireless block operates by using as a basis the clock of one VCO 13, and supplies a frequency-divided clock as a reception clock RXCLK also to the PHY block 26. Transmission data TXD received at the RF block 25 is therefore synchronized with the clock of the RF block 25. In a following example, an oscillation frequency of VCO is set to 8 GHz and the reception clock RXCLK is set to 500 MHz.

In the PHY block; 26, the transmission data TXD reaches the modulator 9 via a route of the interface circuits 8 and 19. Furthermore, synchronization is established at the D-latch 23, and a sync clock input to the D-latch 23 is supplied via a route of the interface circuits of 16 and 18.

For example, a high speed clock at several hundreds MHz or higher is used in order to allow the wireless apparatus shown in FIG. 2 to perform high speed information transmission and improve the precision of distance measurement. In a case where a delay time in the path from the interface circuit 16 to the interface circuit 8 via the D-latch 23 is one clock period or longer, there is a possibility that the modulator 9 cannot acquire transmission data TXD correctly.

This delay time differs at each device mainly due to a process variation. The delay time changes with a temperature fluctuation even in the same device. Although an LVDS interface realizes low voltage balance transmission, for voltage level conversion, the interface circuit is required to be of a large scale in order to overcome substrate capacitance. This large scaling further prolongs a delay time.

Figure 3:
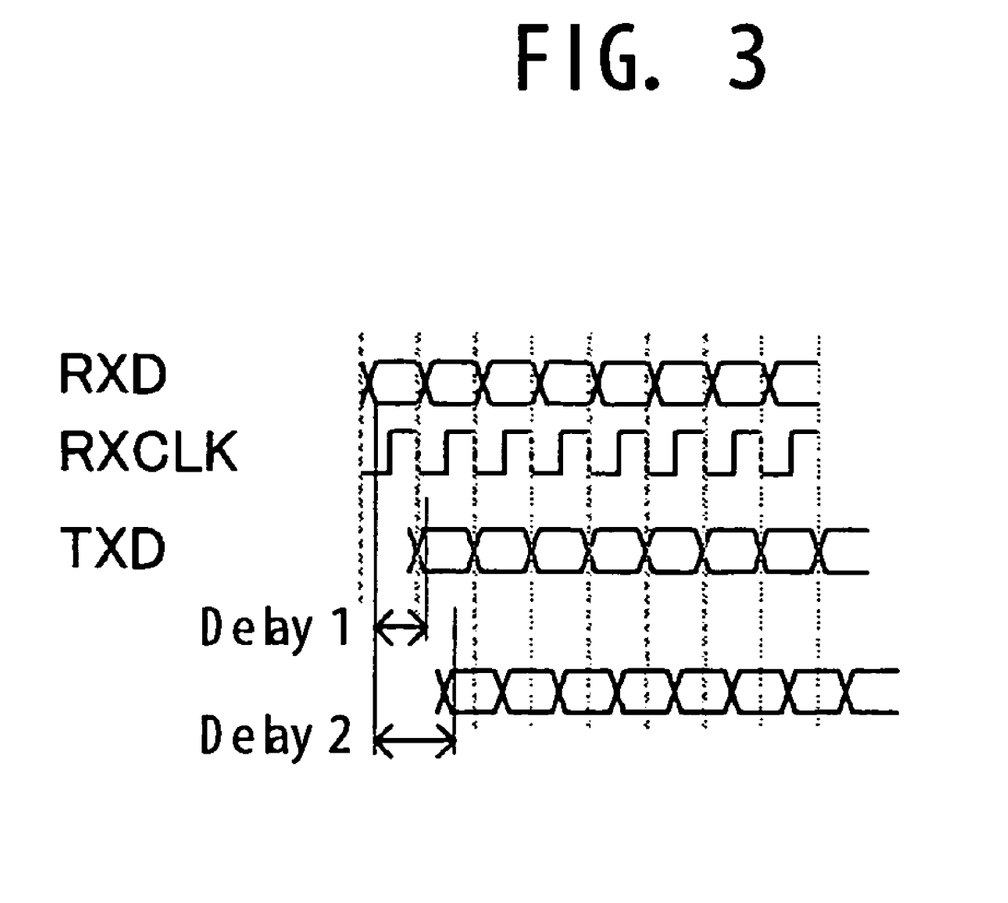
FIG. 3 is a view showing an operation example in which a modulator cannot acquire transmission data correctly because of a delay of a data signal relative to a clock signal.

FIG. 3 illustrates an operation example in which the modulator 9 cannot acquire transmission data TXD correctly because of a delay of a data signal relative to a clock signal. A delay between the data signal and clock signal is roughly classified into a delay in one clock period and a delay over one clock period, the former being labeled Delay 1 and the latter being labeled Delay 2 in FIG. 3.

In a case of Delay 1, a sampling point of the clock and a transition point of the transmission data TXD are superposed because of the delay. In this case, since transmission data is not propagated correctly, there occurs an error of the transmission signal.

In a case of Delay 2 longer than Delay 1, the modulator 9 samples the transmission data TXD at a position delayed by one clock from Delay 1. This is equivalent, as viewed from the PHY block 26 using the reception data clock RXCLK as a criterion, to inserting one clock delay into the transmission data TXD.

According to Patent Documents 6-8, data can be delayed relative to the clock to a position where the data can be correctly acquired, when data is transferred synchronously with the clock. However, only Delay 1 corresponding to a delay in one clock period is compensated, and Delay 2 over one clock period is not processed specifically. In usual data transmission, it is sufficient if delay in one clock period is compensated. In contrast, in a ranging system for measuring a distance between wireless apparatuses by using a time from packet transmission to packet reception, a delay time itself is measurement data so that Delay 2 over one clock period is required to be compensated.

The equation (1) describes a real turn-around time of a packet between wireless apparatuses. In this equation, a transmission delay time of each wireless apparatus is already known at the wireless apparatus, and the wireless apparatus transmits and receives by compensating for the delay time in advance. Therefore, if one clock delay is inserted into transmission data, a ranging calculation result changes greatly. For example, in a case where the reception clock RXCLK is 500 MHz, one clock delay corresponds a delay of 2 ns. This appears as an error of a measurement result of a measured time t. This error corresponds to 60 cm in the velocity of light. A ranging value is shifted by about a half of 60 cm, i.e., 30 cm.

Figure 4:
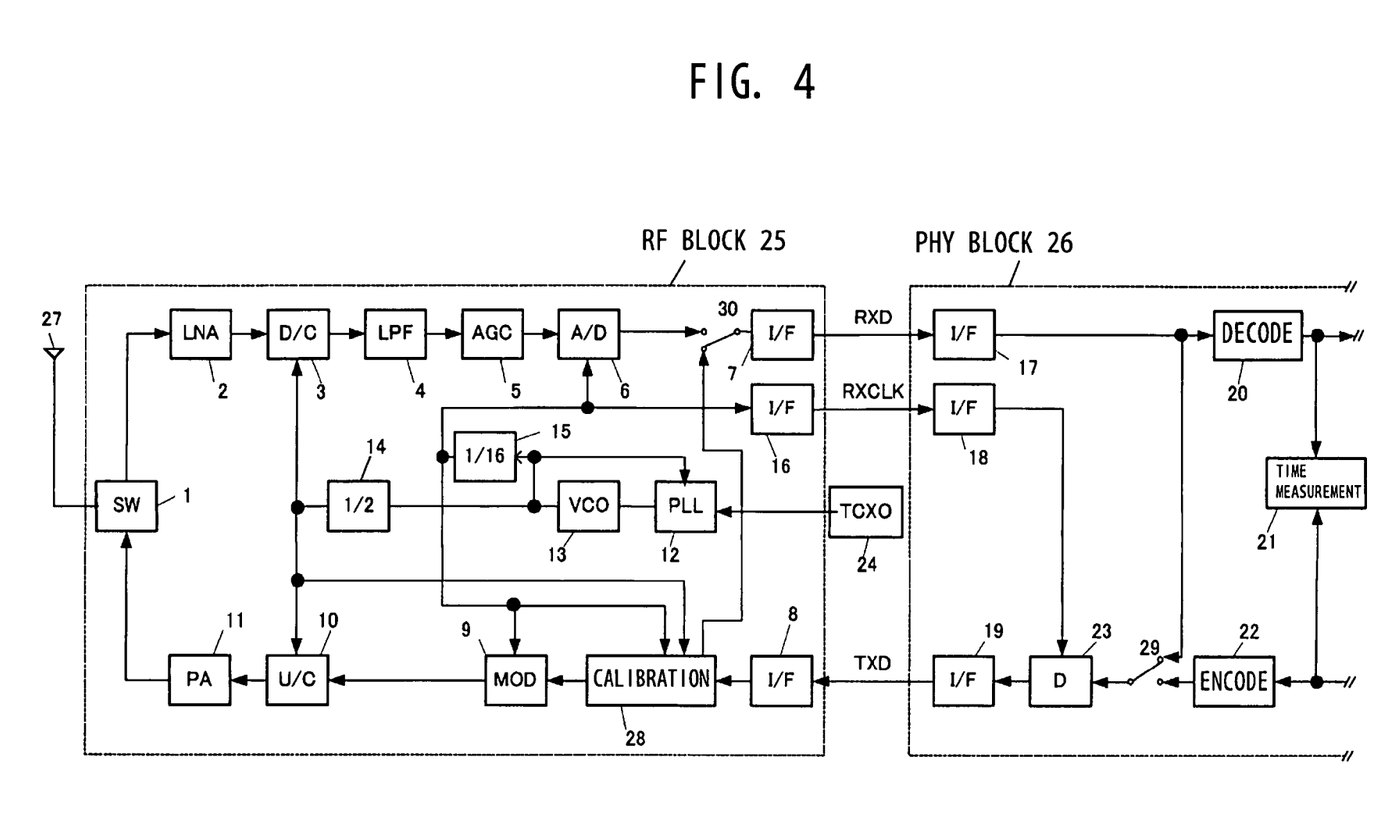
FIG. 4 is a view showing a configuration of a wireless communication apparatus according to one embodiment of the present invention.

In order to solve both the two cases of Delay 1 and Delay 2, the present invention proposes the structure of an apparatus as shown in FIG. 4 in which a block having the following function is added to the structure of the wireless communication apparatus shown in FIG. 2. In FIG. 4, reference numerals 1 to 27 represent the same functions as those illustrated in FIG. 2, and the description thereof is omitted in the following.

The wireless communication apparatus shown in FIG. 4 uses a calibration pulse generated by a calibration unit 28 to perform a calibration operation, i.e., compensation for a delay time in a path from an interface circuit 16 to an interface circuit 8 via a D-latch 23. A switch 29 sets a route for looping back an output of an interface circuit 17, i.e., reception data RXD from an RF block 25, to the D-latch 23. A switch 30 switches between a digitalized reception signal and a calibration pulse from the calibration unit 28.

Figure 5:
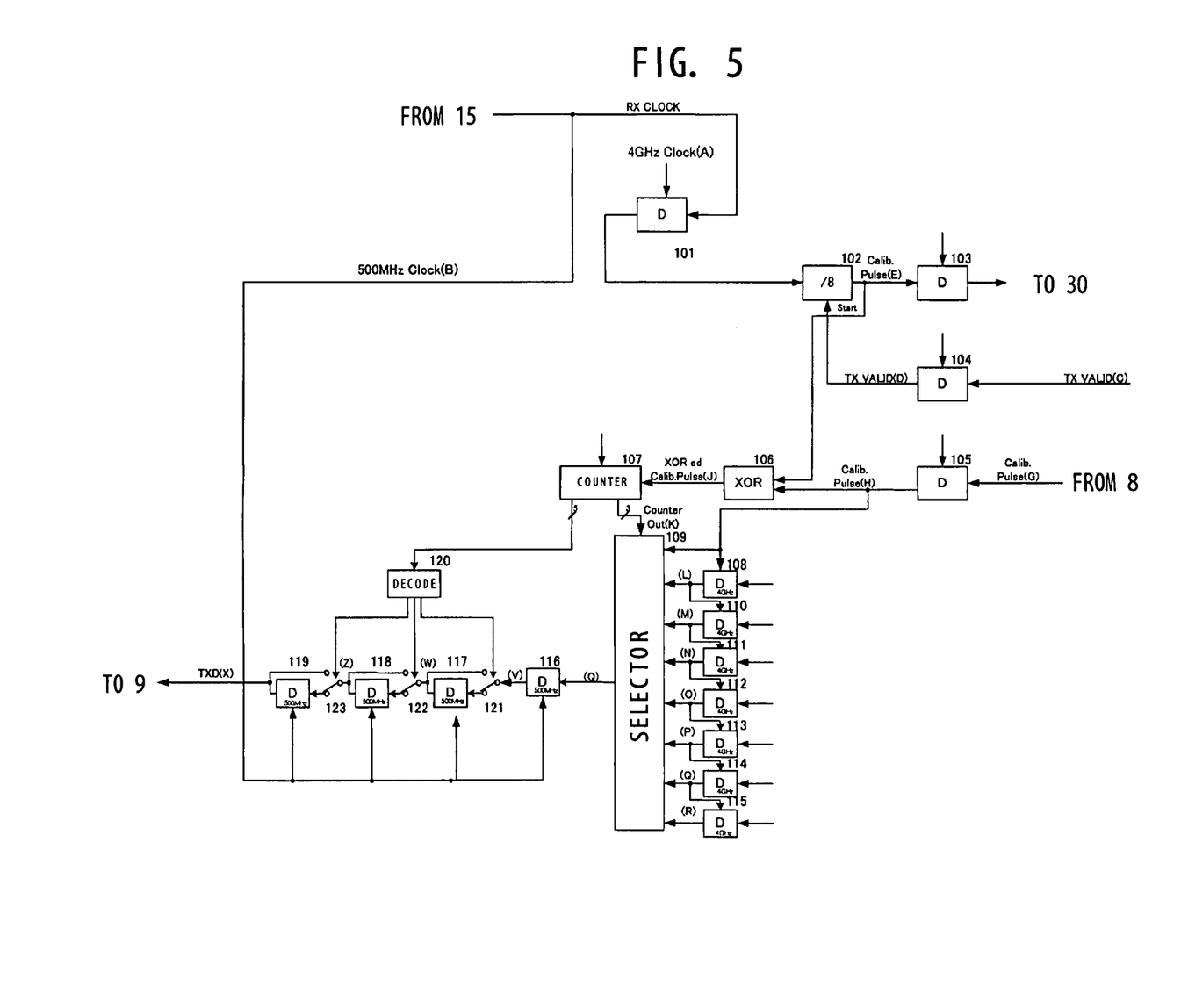
FIG. 5 is a view showing a circuit structure of a calibration unit of the wireless communication apparatus shown in FIG. 4.

The calibration unit 28 has a circuit structure shown in FIG. 5.

A D-latch 101 synchronizes a reception clock RXCLK with 4 GHz. A frequency divider 102 frequency-divides an output of the D-latch 101 to generate a long period pulse having a frequency equal to an integer multiple of the frequency of the reception clock RXCLK. A D-latch 103 synchronizes the long period pulse generated by the frequency divider 102 with a 4 GHz clock. A D-latch 104 synchronizes a transmission start signal (TX_VALID) from the PHY block with the 4 GHz clock. The frequency divider 102 synchronizes an output of a D-latch 104 with the reception clock RXCLK.

A D-latch 105 latches the transmission data TXD at a 4 GHz period. An XOR gate 106 compares the phase of a calibration pulse from the frequency divider 102 with the phase of a calibration pulse looped back from the D-latch 105. A counter 107 counts at 4 GHz only during an output period of the XOR gate.

Reference numerals 108 and 110 to 115 represent D-latches each for delaying an output of the D-latch 105 by one period of 4 GHz and operating to compensate for a delay time Delay 1 in one clock period. A selector 109 selects one of the outputs of the D-latches 108 and 110 to 115 in accordance with a count of the counter 107.

A D-latch 116 samples an output of the selector 109 at the 500 MHz clock. Each of D-latches 117 to 119 delays an output of the D-latch 116 by one clock to compensate for a delay time Delay 2 over one clock period. Each of switches 121 to 123 controls an insertion of a corresponding one of the D-latches 117 to 119. A decoder 120 controls to turn on/off the switches 121 to 123 in accordance with an output of the counter 107.

A brief operation of the calibration unit 28 will be given in the following.

1. Before transmission data is sent, a calibration pulse having a time duration longer than an anticipated maximum delay time is sent from the reception side (RXD side) interface of the RF block 25.

2. The calibration pulse is looped back on the side of the PHY block 26 and is sent to the transmission side TXD of the RF block 25.

3. On the transmission side TXD, a delay (phase difference) between the looped back pulse and the own pulse is measured to identify a pulse sampling position (solving the phenomenon of Delay 1).

4. A proper delay time is inserted into the transmission data TXD to make a delay of TXD always constant (solving the phenomenon of Delay 2).

Figure 6:
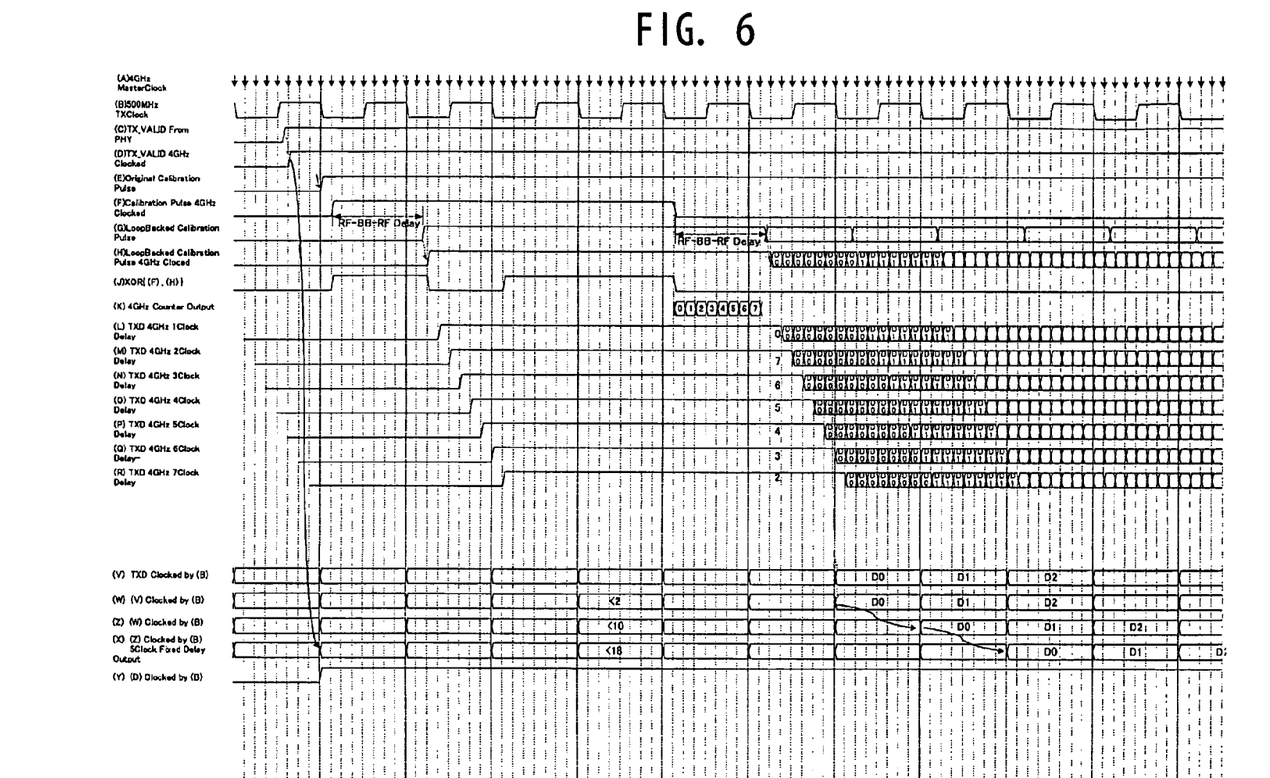
FIG. 6 is a view showing temporal waveforms of each signal in the calibration unit.

FIG. 6 shows temporal waveforms of respective signals in the calibration unit 28. In FIG. 6, signals are represented by (A) to (Z). In an example shown in FIG. 6, it is assumed that the frequency of the VCO is 8 GHz and a clock at 4 GHz obtained by frequency-dividing 8 GHz by ½ is supplied. It is also assumed that the reception clock RXCLK is 500 MHz and the transmission data TXD is 500 MBPS. In FIG. 6, (A) represents the 4 GHz clock and (B) represents the reception clock RXCLK.

First, the PHY block 26 sends a TX_VALID signal (C) as a transmission start event, and at the same time the switch in the PHY block 26 is switched to the loop-back side.

In the calibration unit 28, the TX_VALID signal is once synchronized with the 4 GHz clock at the D-latch 104, resulting in (D), and then sent to the frequency divider 102.

The frequency divider 102 generates a calibration pulse (E) having a long period (in this case, 8 ns), on the basis of (D) and (B). This calibration pulse (E) is again synchronized with the 4 GHz clock at the D-latch 103, resulting in (F), and thereafter applied to the switch 30.

After passing through the switch 30, the calibration pulse is sent to the interface circuit 7 and received at the interface circuit 17 on the PHY block 26 side. The calibration pulse (F) is input to the interface circuit 8 on the RF block 25 side via the switch 29, the D-latch 23 and the interface circuit 19. A signal input to the calibration unit 28 via the interface circuit 8 has a waveform (G) in FIG. 6 because of a delay.

In the calibration unit 28, the signal (G) is again synchronized with the 4 GHz clock, resulting in (H), and thereafter, the signals (E) and (H) are XORed at the XOR gate 106, resulting in (J), and the signal (J) is input to the counter 107. The counter 107 counts at the 4 GHz clock during a period from the falling edge of the signal (F) to the falling edge of an XOR result. In this example, eight clocks from 0 to 7 are counted at 4 GHz.

The counter 107 is a 5-bit counter, and the lower three bits of the count are input to the selector 109. There are eight input signals (H) and (L) to (R) to the selector 109. The signals (L) to (R) are obtained by sequentially shifting the signal (H) at the 4 GHz clock. In accordance with this 3-bit signal, the selector 109 selects one of the signals (H) and (L) to (R). Selection mapping is (M) to (R), (H) to (M) for the counts of 0 to 7.

In the example shown in FIG. 6, since the count is 7, the selector 109 selects the signal (M) and sends it to the D-latch 116.

The D-latch 116 samples the signal sent from the selector 109 at the reception clock RXCLK (B). Because of the above-described mapping rule of the selector 109, the signal (D0) at 500 MBPS sent after the calibration pulse can be sampled at the center of the period of the signal.

With the above-described operation, it is possible to solve the problem that data cannot be acquired correctly because of a delay in one clock period such as Delay 1 shown in FIG. 3.

Next, by using the decode output of the 5-bit output of the selector 109, the routes of the D-latches 117 to 119 are switched in accordance with the decoded count. In this example, the D-latches 118 and 119 are selected so that a delay of two clocks at 500 MHz is inserted. An output of the D-latch is a signal (Z) delayed to the time shown in FIG. 6.

As described above, even for different delay amounts, a delay amount can be adjusted to the same position as that of the anticipated maximum delay time. Namely, it is possible to solve the problem associated with a delay over one clock period such as Delay 2 shown in FIG. 3.

The present invention has been described above with reference to a particular embodiment. It is obvious that modifications and substitutions of the embodiment can be made by those skilled in the art without departing from the gist of the present invention.

In this specification, the embodiment of the invention has been described by taking as an example a wireless apparatus for performing ranging by measuring a turn-around radio wave propagation time during packet communication with a communication partner. The gist of the present invention is not limited to the embodiment. The present invention is applicable to other data processing apparatuses required to compensate for a delay time between a data signal and a clock signal, with similar operations and effects being provided.

In this specification, the embodiment of the invention has been described by taking as an example a wireless apparatus in which a wireless block and a physical layer block are configured in separate LSI chips which are interconnected by interfaces, and a delay time between a data signal and a clock signal is compensated, the data signal being reciprocated between both the blocks. The gist of the present invention is not limited to the embodiment. The present invention is applicable to other data processing apparatuses of other circuit structures required to compensate for a delay time between a data signal and a clock signal, with similar operations and effects being provided.

In summary, the present invention is disclosed in the illustrative form, and the description of the specification should not be construed limitedly. In order to determine the gist of the present invention, appended claims should be taken into consideration.

What is claimed is:

1. A wireless communication apparatus for transmission/reception of a wireless communication signal, comprising:
   first and second circuits for processing a transmission/reception signal;
   an oscillator for generating a reception clock on a first circuit side, the reception clock being used for an operation reference;
   a first interface for supplying the reception clock from said first circuit to said second circuit;
   a second interface for inputting, to said first circuit, transmission data output from said second circuit synchronously with the reception clock supplied from said first circuit; and
   delay compensating means for compensating for a delay between the reception clock and transmission data at said first circuit, the reception clock and transmission data being input via said second interface,
   wherein, in a data transmission mode a data transmission process is executed, and in a calibration mode a delay time of transmission data is computed, and in said calibration mode, said delay compensating means sends a calibration pulse having a duration over an anticipated maximum delay time from said first circuit to said second circuit via said first interface, and compensates for a delay time on the basis of a delay between a pulse looped-back from said second circuit to said first circuit via said second interface and the original calibration pulse, and
   in accordance with a phase difference between the pulse looped-back from said second circuit to said first circuit via said second interface and the original calibration pulse, said delay compensating means compensates for a delay time less than one clock period and inserts a proper delay amount into transmission data to make the transmission data have the maximum delay time.

2. The wireless communication apparatus as claimed in claim 1, wherein said first circuit is a wireless circuit module for performing a transmission/reception process of a wireless communication signal, and said second circuit is a physical layer module for processing transmission data in a physical layer protocol.

3. The wireless communication apparatus as claimed in claim 1, wherein said delay compensating means inserts a proper delay amount into the transmission data and maintains a delay of the transmission data to be always constant.

* * * * *